United States Patent
Ikeda et al.

(10) Patent No.: US 8,116,627 B2
(45) Date of Patent: Feb. 14, 2012

(54) PON SYSTEM METHOD FOR RECEIVING OPTICAL SIGNAL AND OLT

(75) Inventors: Hiroki Ikeda, Hachioji (JP); Toshiki Sugawara, Kokubunji (JP); Yusuke Yajima, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 783 days.

(21) Appl. No.: 12/222,224

(22) Filed: Aug. 5, 2008

(65) Prior Publication Data

US 2009/0162053 A1     Jun. 25, 2009

(30) Foreign Application Priority Data

Dec. 19, 2007   (JP) ................................. 2007-326697

(51) Int. Cl.
*H04B 10/20*   (2006.01)
(52) U.S. Cl. .......................................... 398/66; 38/202
(58) Field of Classification Search ............... 398/66–72
See application file for complete search history.

(56) References Cited

U.S. PATENT DOCUMENTS

| | | | | |
|---|---|---|---|---|
| 7,555,228 B2* | 6/2009 | Ruegg et al. | ................... | 398/209 |
| 2008/0089686 A1* | 4/2008 | Kazawa et al. | ................... | 398/71 |

FOREIGN PATENT DOCUMENTS

| | | |
|---|---|---|
| JP | 2004-15243 | 6/2002 |
| JP | 2005-45560 | 7/2003 |

* cited by examiner

*Primary Examiner* — Leslie Pascal
(74) *Attorney, Agent, or Firm* — Stites & Harbison, PLLC; Juan Carlos A. Marquez, Esq.

(57) ABSTRACT

When a signal of weak optical power is received immediately after a signal of intense optical power, input of the signal of intense optical power readily causes saturation, and the influence interferes in the signal of weak optical power to deteriorate receiver sensitivity. Moreover, when a reverse-bias voltage of APD is changed, if a difference between the voltages is large, a next optical signal is received until the receiver sensitivity of the APD becomes stable, so that receiver sensitivity deteriorates. A DBA order is determined so that a difference in reverse-bias voltage is small, and reverse-bias voltage is controlled in line with reception timing from ONU.

15 Claims, 10 Drawing Sheets

FIG. 5

| | 501 | 502 | 503 | 504 |
|---|---|---|---|---|
| | ONU ID | LEVEL DIFFERENCE BETWEEN ONU AND OLT [dB] | OLT INPUT POWER [dBm] | REVERSE-BIAS VOLTAGE [V] |
| | 1 | -10dB | -11dBm | 15V |
| | 2 | -20dB | -21dBm | 20V |
| | 3 | -5dB | -6dBm | 10V |
| | 4 | -25dB | -26dBm | 25V |

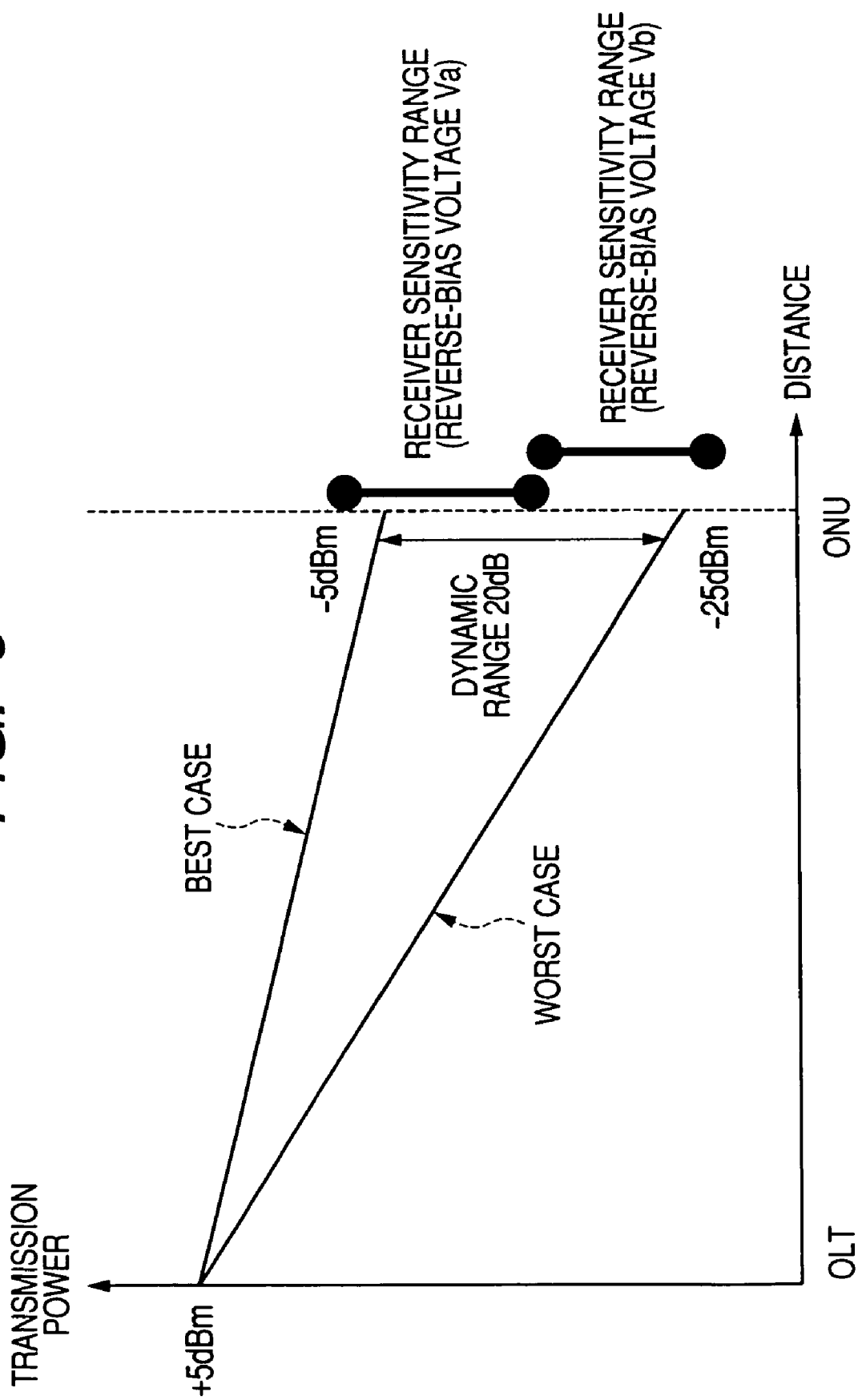

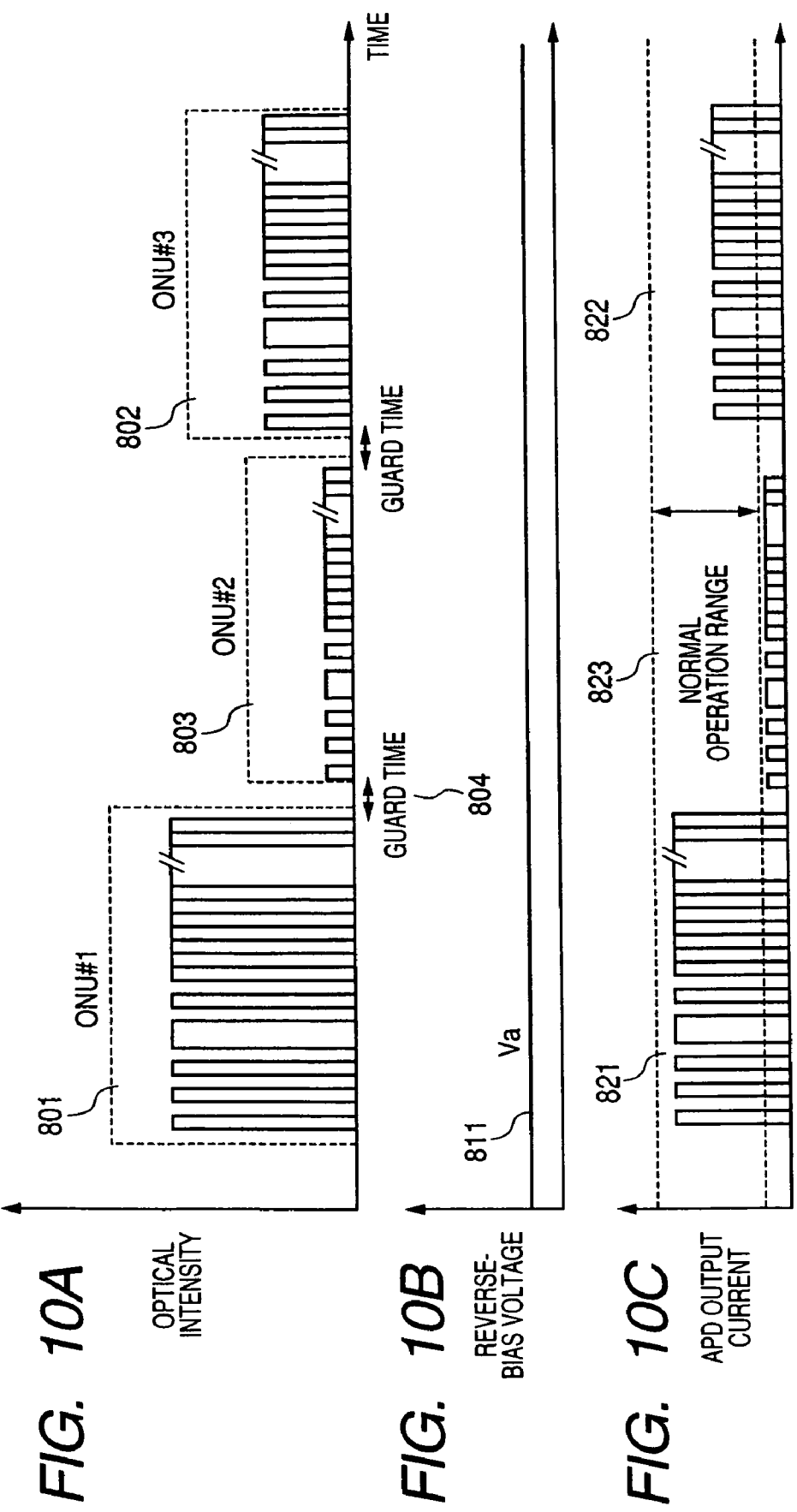

PON SYSTEM METHOD FOR RECEIVING OPTICAL SIGNAL AND OLT

CLAIM OF PRIORITY

The present application claims priority from Japanese application JP 2007-326697 filed on Dec. 19, 2007, the content of which is hereby incorporated by reference into this application.

FIELD OF THE INVENTION

The present invention relates to an optical line terminal and a passive optical network system, and more particularly to an optical line terminal that converts an optical signal into an electrical signal by an APD (Avalanche Photo Diode) that receives the optical signal through an optical fiber, and a passive optical network system (PON).

BACKGROUND OF THE INVENTION

The passive optical network (PON) system is an optical fiber access technology. It is a high-speed broadband access technology that can offer high-speed communication at low costs. Normally, the passive optical network (PON) system, which includes an optical line terminal (OLT), an optical network unit (ONU), and an optical distribution network (ODN), provides end users with a broadband access method, and has many advantages over other present broadband access technologies. The most conspicuous advantage is that the passive optical network, for example, a GE-PON system can provide end users with access speeds of gigabit level, and the end users can accommodate more satisfactorily to broadband networks.

A single-core optical fiber is used for a line between OLT and ONU, and a downstream signal (communication direction from OLT to each ONU) and an upstream signal (communication direction from ONU to OLT) are sent and received with wavelength 1490 nm and 1310 nm, respectively.

Downstream signals to individual ONUs from OLT are transmitted specifying a destination ONU by the optical broadcaster system, and an ONU selectively receives a signal addressed to it. Conversely, upstream signals to OLT from individual ONUs, to avoid collision of the signals, are transmitted by ONU permitted for transmission by OLT after adjusting transmission timing by the time division multiple access system (TDMA system).

The dynamic bandwidth allocation (DBA) system, which is known as a method for adjusting transmission timing, determines an upstream allocated bandwidth of each ONU and transmission timing from each ONU, based on transmission requests from all ONU.

By the way, in OLT, when receiving an optical signal transmitted from ONU, an avalanche photo diode (APD) having optical multiplication effect is used. The APD can receive signals of weak optical power with high sensitivity by multiplication effect by a reverse-biased PN junction part. Generally, by setting a current multiplication factor of APD large for weak signals, and setting it small for intense signals, reverse-bias voltage of APD are adjusted. In other words, to increase a current multiplication factor (M value) of APD, a reverse-bias voltage is set large, and to reduce a current multiplication factor of APD, a reverse-bias voltage is set small. Usually, a reverse-bias voltage is adjusted and set when a device is introduced. In a PON system, however, since optical power signals from individual ONUs are different, the dynamic range of optical receiver sensitivity of an optoelectronic transducer of OLT must be widened. Although APD can receive signals of weak optical power with high sensitivity because of multiplication effect by the reverse-biased PN junction part, once a multiplication factor is set by applying a reverse-bias voltage, the range of optical receiver sensitivity of APD is determined. It is known that the range of optical receiver sensitivity becomes narrow when a high-speed optical signal is received, and in a high-speed PON system, there is a problem that a signal of intense optical power and a signal of weak optical power cannot be received at the same time. A detailed description is made below.

FIG. 8 is a schematic diagram of a PON system in a related art. OLT 10 and plural ONUs 20 are connected by an optical fiber via light splitters 30a and 30b. Usually, OLT is installed in a station office of a carrier, and ONUs are installed in home.

The operation of the PON system is briefly described. A downstream packet inputted to the OLT 10 from an upper network is converted into a PON frame in the OLT 10, and an optical signal is broadcast to the ONUs 20 via the optical fiber 30. The optical signal is branched in the light splitters 30a and 30b before being transmitted to the ONUs 20. An ONU having a matching transmission destination address captures the optical signal, and processes the packet for decoding.

On the other hand, an upstream signal transmitted from the ONUs 20 is transmitted to the OLT 10 via the light splitter 30a. In the OLT 10, an upstream signal received in the APD 15 is converted into a current signal, converted into a voltage signal via a transimpedance amplifier 16, and inputted to a post amplifier 17. For the inputted signal, a PON frame is decoded in PHY 18, and subjected to predetermined processing in a MAC frame processing unit 19 before being outputted to the upper network. The OLT 10 is provided with a DC current source 14 of voltage variable type that applies a reverse-bias voltage to the APD. A satisfactory receiver sensitivity is set by applying a reverse-bias voltage usually at the time of introduction.

Upstream packets transmitted from the ONUs 20 must be avoided conflicting with each other in terms of time. Therefore, CPU 11 provided in the OLT 10 determines upstream transmission timing by the dynamic bandwidth allocation system (DBA). An ONU 20 determined for transmission timing sends an upstream packet at the allocated time. As a result, collision of upstream packets among the ONUs is avoided. Although the OLT and the ONUs must share time, this can be done by including time information in downstream packets.

When the OLT receives optical signals from the ONUs, since the number of splitters existing between the OLT and the ONUs, and the distance of the optical fiber differ for different ONUs, the received signals are different in optical power.

FIG. 10A is a drawing showing differences of optical power among upstream packets from the ONUs, and takes optical power in a vertical axis and time in a horizontal axis. A packet from the ONU 20a, a packet 803 from the ONU 20b, and a packet 802 from the ONU 20c are received, and are different in reception optical power. The cycle of a signal of each packet is about one nanosecond.

FIG. 9 shows an example of a level diagram and optical receiver sensitivity in the PON system. In the PON system, to accommodate differences of transmission distance and the number of branches, a wide dynamic range of optical receiver sensitivity is required. For example, the IEEE802.3 standards dictate about 20 dB. However, when a high-speed optical signal is received, for example, during high-speed transmission such as 10 Gbps, the light-receiving range of APD when a multiplication factor is set by applying a reverse-bias voltage is smaller than 20 dB. As shown in FIG. 9, when a reverse-bias voltage Va of the APD is set for a signal of intense optical power, there has been a problem that optical signals of weak optical power cannot be received.

FIGS. 10B and 10C show reverse-bias voltage and output currents of the APD, and take time in a horizontal axis. As shown in FIG. 10B, in the PON system, a reverse-bias voltage 811 is set constant in terms of time. At this time, as shown in FIG. 10C, output currents 821 and 822 of the APD satisfy a current range in which the transimpedance amplifier 16 and following circuits operate normally. However, an output current 823 of the APD does not fit in the current range in which they operate normally. Specifically, the OLT 10 can receive signals 821 and 822 of intense optical power, but cannot receive a signal 823 of weak optical power. As described above, although the development of high-speed technology for PON is rapid, since the dynamic range of the optical receiver sensitivity of very high-speed photoelectric conversion elements is small, signals different in optical power cannot be received at the same time, so that requirements for the PON system cannot be satisfied. As a countermeasure for such a problem, when an optical signal transmitted from an ONU is received, a reverse-bias voltage corresponding to each ONU is set in the APD in line with reception timing of a signal permitted for the ONU. This technology is disclosed in, for example, JP-A-2005-45560.

To facilitate the setting of threshold for determining the level of light-receiving signals, the order of adjacent time slots is controlled so that a change in light-receiving intensities in the time slots becomes small, based on the light-receiving intensities of optical signals. This technology is disclosed in, for example, JP-A-2004-15243.

SUMMARY OF THE INVENTION

However, when a signal of weak optical power is received immediately after a signal of intense optical power, input of the signal of intense optical power readily causes saturation, and the influence interferes in the signal of weak optical power to deteriorate receiver sensitivity. Moreover, when a reverse-bias voltage of the APD is changed, if a difference between the voltages is large, a next optical signal is received until the receiver sensitivity of the APD becomes stable, so that receiver sensitivity deteriorates. Specifically, in a very high-speed PON as fast as 10 Gbps, if a reverse-bias voltage is changed to control a multiplication factor of the APD using only transmission information of a packet of an upstream signal as described in JP-A-2005-45560, a next signal is received until the reception sensibility of the APD becomes stable, so that there are cases where optical signals cannot be received. In other words, a problem that optical signals different in optical power cannot be received is not solved.

In a very high-speed PON as fast as 10 Gbps, as described above, since there occurs a problem that light cannot be received because of the light-receiving properties of the APD, and optical power cannot be measured, a receivable range of the APD during high-speed communication must be controlled by reverse-bias voltage. For example, when a signal of optical power outside a light receivable range of the APD is received, the APD does not operate normally. Specifically, in a very high-speed PON as fast as 10 Gbps, when reverse-bias voltage are changed in association with ONU for light intensities, the order of time slots cannot be controlled based on only optical power, as it can be in JP-A-2004-15243.

Accordingly, the present invention aims at receiving signals correctly in the APD while widening the dynamic range of the APD when reverse-bias voltage are changed in association with ONU.

When a reverse-bias voltage of the APD is changed, since a next signal must be received after stabilization, guard time must be widened, and bandwidth cannot be effectively used.

Accordingly, the present invention aims at correctly receiving signals in the APD even without widening guard time.

In a passive optical network (PON) system in which an optical line terminal (OLT) and plural optical network units (ONU) are connected via an optical fiber, the OLT includes an optoelectronic transducer that changes in current multiplication factor according to applied reverse-bias voltage, and when transmission bandwidths of upstream signals are allocated to the plural ONUs, determines an allocation order of the transmission bandwidths so that a voltage difference between a reverse-bias voltage necessary to receive an upstream signal from ONU to which transmission bandwidth was allocated immediately before, and another bias voltage is small.

Since the dynamic range of receiver sensitivity of the optical line terminal can be widened by the present invention, even when the light intensities of received signals are different, a high-speed PON system can be realized. Moreover, since guard time can be shortened, bandwidth can be effectively used.

BRIEF DESCRIPTION OF THE DRAWINGS

FIG. 5 is a drawing showing an ONU reverse-bias voltage correspondence table in an embodiment of the present invention;

FIG. 9 is a drawing for explaining the dynamic range of conventional optical receiver sensitivity; and FIG. 10A, FIG. 10B, and FIG. 10C are drawings for explaining a conventional method of setting reverse-bias voltage.

DETAILED DESCRIPTION OF THE PREFERRED EMBODIMENTS

Hereinafter, embodiments of the present invention will be described with reference to the accompanying drawings. Embodiments of the present invention will be described using an example of using IEEE standards EPON as a PON system. However, the present invention is not limited to the PON.

First Embodiment

Figure 1:
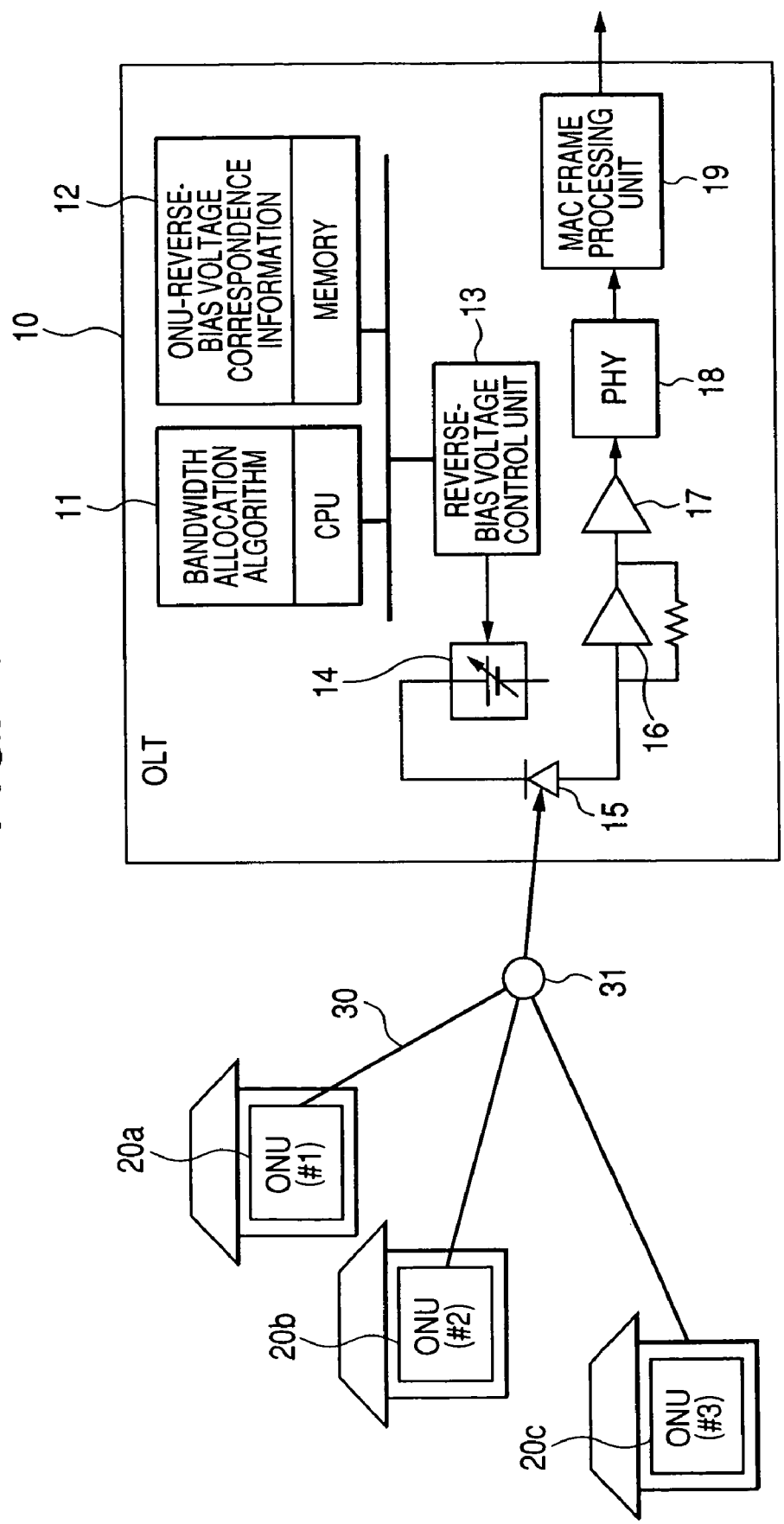
FIG. 1 is a block diagram of a PON system of a first embodiment of the present invention.

Hereinafter, a basic configuration of the present invention will be described with reference to FIG. 1. FIG. 1 is a block diagram of a PON system of a first embodiment of the present invention.

As shown in FIG. 1, the system includes an optical line terminal (OLT), an optical network unit (ONU) 20, and an optical fiber 30 and an optical branching device 31 disposed between them.

The internal construction of the OLT 10 primarily includes a portion related to the reception of an upstream optical signal, that is, a portion that receives an optical signal transmitted from each ONU 20, a portion that processes frames, and an OLT control portion.

The portion that receives an upstream optical signal includes a reverse bias control unit 13, a DC current source 14 of voltage variable type that gives reverse-bias voltage to APD, an APD element 15, a transimpedance amplifier 16 for converting a current signal into a voltage signal, and a post amplifier 17. The portion that receives an upstream optical signal converts an optical signal into an electrical signal for transmission to the portion that processes frames.

The portion that processes frames includes PHY 18 and a MAC frame processing unit 19. The PHY 18 decodes PON frame code. The MAC frame processing unit, which processes MAC frames, is connected with an external network.

A control portion of the OLT includes a CPU 11 and a memory 12. In the memory 12, data (ONU-reverse-bias voltage correspondence information) associated with a reverse-bias voltage corresponding to ONU relating to the present invention is stored. The CPU 11 holds a bandwidth allocation control algorithm relating to the present invention. The CPU 11 is used to control the operation of each unit module of the optical line terminal to make, for example, unit modules such as the unit modules reverse-bias voltage control 13, the random access memory 12, the PHY 18, and the MAC frame processing unit 19 to cooperate.

An upstream optical signal from each ONU is converted into a current signal in the APD 15 via the optical fiber 30, and converted into a voltage signal through the transimpedance amplifier 16. A voltage signal outputted from the transimpedance amplifier 16 is amplified by the post amplifier 17 having an AGC (automatic gain control) function and decoded in the PHY 18. The decoded signal is subjected to specific processing in the MAC frame processing unit and outputted to an upper network.

By the way, a reverse-bias voltage for setting a current amplification factor (M value), which must be applied to the APD 15, is applied as a reverse-bias voltage to the APD by a direct current 14 controlled by the reverse-bias voltage control unit 13. The reverse-bias voltage control unit 13, as described later, is controlled by the CPU 11 as to a reverse-bias voltage value and timing. The method of controlling reverse-bias voltage will be described later.

The following describes a method for controlling reverse-bias voltage and timing. Referring to reverse-bias voltage information stored in the memory 12, the CPU 11 provided in the OLT 10 determines transmission timing of an upstream optical signal of ONU 20 by the dynamic bandwidth allocation system (DBA), and controls reverse-bias voltage control 13. The ONU 20 allocated transmission timing sends an upstream packet at the determined time. Therefore, a collision of an upstream packet between ONUs is avoided. The OLT and the ONUs must share time. This can be achieved by including time information in an outgoing packet.

The reverse-bias voltage control 13 commands the DC current source 14 of voltage variable type to set a reverse-bias voltage value stored in the memory 12 in the OLT at time earlier than reception time, based on the determined upstream transmission timing of the ONUs, and applies a reverse-bias voltage to the APD 15. Thereby, a reverse-bias voltage of the APD can be changed according to reception timing of a signal from the ONU, signals from individual ONUs different in optical power can be received.

Figure 2:
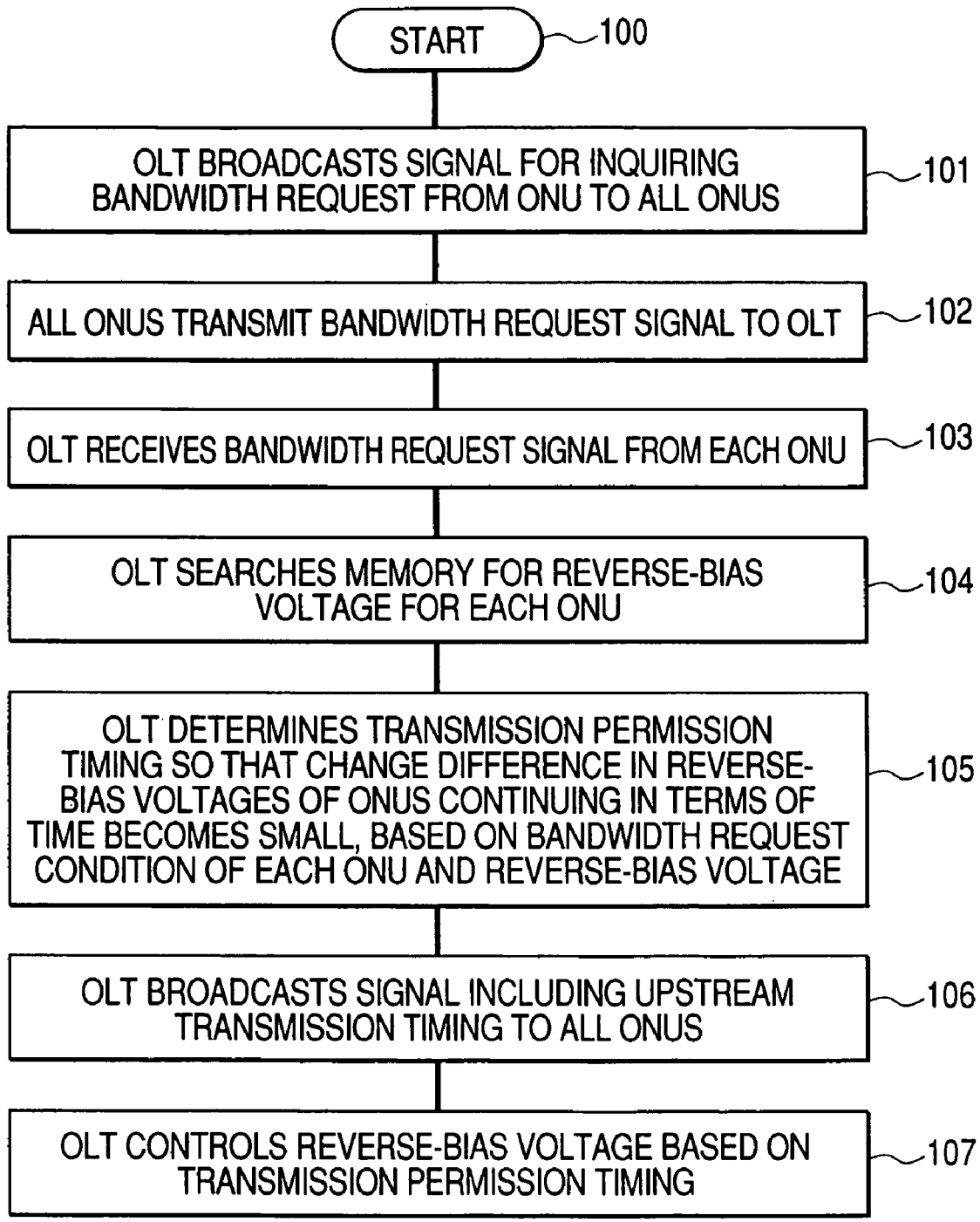
FIG. 2 is a flowchart for explaining the operation of a first embodiment of the present invention.

Hereinafter, referring to FIG. 2, as a first embodiment, an operation procedure of the entire PON system is described. A method for determining transmission timing and a method for controlling reverse-bias voltage are described.

The OLT broadcasts a signal for inquiring a bandwidth request from the ONUs to all ONUs (Step 101). However, this step is not required when the ONUs automatically transmits a bandwidth request signal. After that, the ONUs transmit a bandwidth request signal called a REPORT frame to indicate the amount of data stored in buffers of the ONUs to the OLT (Step 102), and the OLT receives the bandwidth request signal (Step 103).

Next, the CPU 11 searches ONU-reverse-bias voltage correspondence information stored in the memory 12 (Step 104), determines the order of ONUs to transmit so that the difference of changes in reverse-bias voltage of ONUs continuing in terms of time is small based on bandwidth request conditions of each ONU and reverse-bias voltage information, and determines transmission permission timing (Step 105).

Thereby, when the APD receives a signal of weak optical power immediately after a signal of intense optical power, since the influence interferes in signals of weak optical power, the order of ONUs to transmit can be determined so that the influence of interference is sufficiently small. When an optical signal received by the OLT changes from intense optical power to weak optical power, that is, when a change is made from a low reverse-bias voltage to a high reverse-bias voltage, since interference is prone to occur, the order of ONUs to transmit is determined with a change value of voltage in mind. Input intensity may be referenced to determine the order of ONUs to transmit.

Although the setting of a reverse-bias voltage requires much time until an APD light receiving circuit becomes stable, by applying this step, the order of ONUs to transmit can be determined sufficiently shorter than guard bandwidth time. The guard bandwidth time is defined as the time difference between the termination timing of transmission of an optical signal of a preceding ONU and the start timing of transmission of an optical signal of a following ONU. For example, when there is no change difference in reverse-bias voltage between ONUs continuing in terms of time, the APD light receiving circuit is already stable, and an optical signal is unchangeably received. When a reverse-bias voltage difference is sufficiently small, since the APD is stabilized shortly, the APD light receiving element can be stabilized within guard bandwidth time. By thus determining transmission timing of the ONT with reference to voltage information of reverse bias and optical power received by the OLT, light can be efficiently received even for different light intensities.

Although in the first embodiment, ONU-reverse-bias voltage correspondence information is stored in advance in the memory 12, the APD 15 may detect the intensity of an optical signal, derive a reverse-bias voltage, and store it in the memory. Finally, the OLT broadcasts a signal including transmission timing to all ONUs (Step 106). The OLT controls reverse-bias voltage, based on transmission permission timing (Step 107). Thereby, since reverse-bias voltage of the APD can be changed in line with reception timing of signals from the ONUs, the OLT can receive signals of different light intensities from the ONUs.

Figure 3:
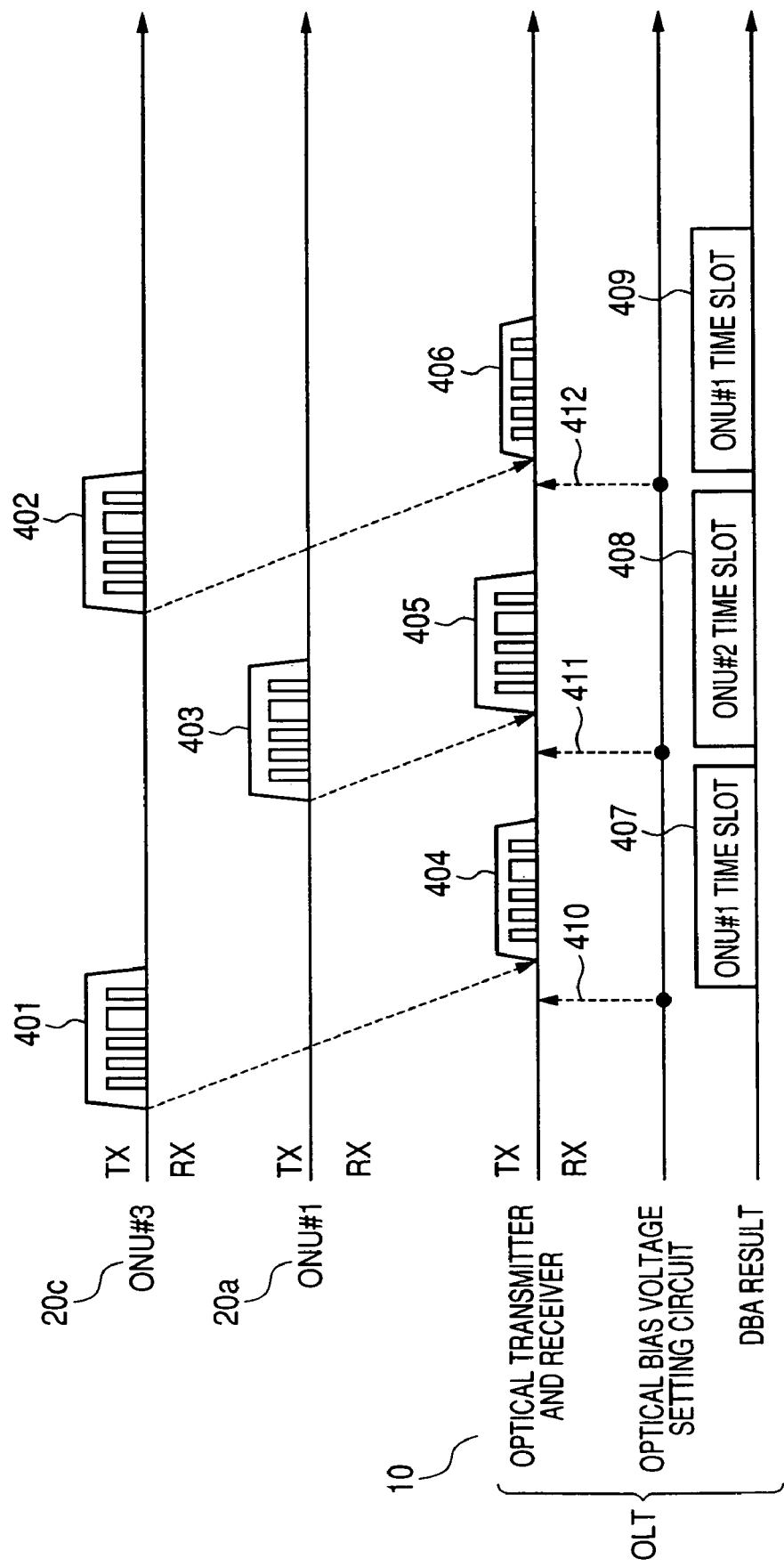
FIG. 3 is a drawing for explaining timing of setting reverse-bias voltage of an embodiment of the present invention.

The following describes a method of setting a reverse-bias voltage of the first embodiment of the present invention with reference to FIG. 3. This embodiment assumes that transmission timing a location to each ONU and its notification have already been made by the DBA system.

ONU (#3) 20c transmits an upstream signal 401 to the OLT 10 in specific transmission timing. The upstream signal deteriorates in optical power because of fiber loss, for example, by long distance transmission before being received in the OLT 10 (404). At this time, the OLT 10 knows a DBA calculation result and an upstream optical signal of the ONU (#3) is received in a reception time slot (407), and immediately before receiving (407) the upstream optical signal, sets a reverse-bias voltage by the above-described method (407), and sets an APD multiplication factor to set the receiver sensitivity of the APD satisfactory. Next, the ONU (#1) 20a transmits an upstream signal 403 to the OLT 10 in specific timing. Based on the same procedure described previously, the OLT 11 sets a reverse-bias voltage (411), and sets an APD multiplication factor to set the receiver sensitivity of the APD satisfactory.

Figure 4:
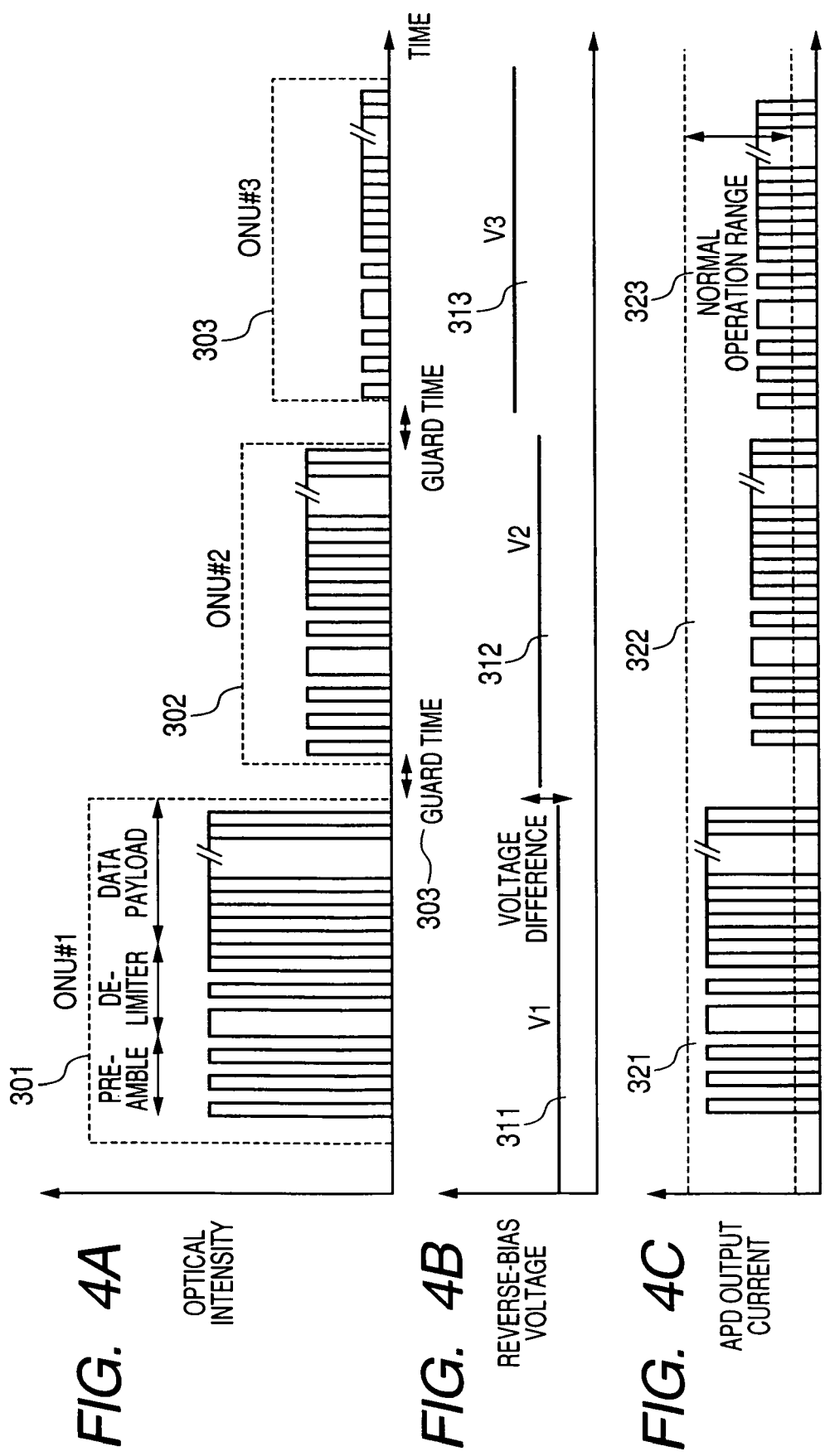
FIG. 4A, FIG. 4B, and FIG. 4C are drawings for explaining a method for allocating bandwidths and setting reverse-bias voltage in a first embodiment of the present invention.

Referring to FIG. 4, the following describes a method of setting bandwidth allocation and reverse-bias voltage in a first embodiment, taking the difference in reverse-bias voltage of the embodiment of the present invention into account.

FIG. 4A shows an example of optical power of an optical signal received in the OLT, and takes optical power in a vertical axis and time in a horizontal axis. Optical signals 301, 302, and 303 show signals from ONU (#1) 20a, ONU (#2) 20b, and ONU (#3) 20c, respectively. The intensity of the optical signals shows reception intensity in the OLT. In short, the optical signal 301 is more intense in optical power than the optical signal 303.

FIG. 4B shows an example of reverse-bias voltage of the APD, and takes reverse-bias voltage in a vertical axis and time in a horizontal axis. Reverse-bias voltage V1 (311), V2 (312), and V3 (313) show the values of reverse-bias voltage when signals are received from the ONU (#1) 20a, ONU (#2) 20b, and ONU (#3) 20c, respectively. When the intensity of an optical signal is intense, a reverse-bias voltage is set small, and when the intensity of an optical signal is weak, a reverse-bias voltage is set large. The reason of adjusting reverse bias is that higher reverse-bias voltage cause an APD current multiplication factor (M value) to become higher, with the result that signals of weak optical power can also be received. However, too intense a optical power causes the APD to saturate due to a multiplier effect, and disables the reception of signals. Conversely, a small bias voltage makes an APD current multiplication factor (M value) small and disables the reception of signals of weak optical power. Therefore, in high speed optical transmission as high as 10 Gbps, reverse-bias voltage must be adjusted to keep APD receiver sensitivity satisfactory.

The DBA determines the respective transmission timings of the ONUs so that a voltage difference between a reverse-bias voltage for ONU to transmit in preceding timing and a reverse-bias voltage for ONU to transmit in next timing is made small. For example, since a voltage difference V2−V1 compares less than a voltage difference V3−V2, the DBA system determines transmission timing of ONUs so that the order of reverse-bias voltage is V1, V2, and V3. Since this helps reduce time until the APD light receiving circuit required when reverse-bias voltage is set becomes stable, guard bandwidth time can be sufficiently shortened.

FIG. 4C shows APD currents received in the OLT, and takes APD currents in a vertical axis and time in a horizontal axis. APD currents 321, 322, and 313 show the values of APD currents after optical signals from the ONU (#1) 20a, ONU (#2) 20b, and ONU (#3) 20c, respectively are subjected to photoelectric conversion. As a result of adjusting reverse-bias voltage, it is understood that the APD currents fit in a current range in which the transimpedance amplifier 16 and following circuits operate normally.

In this state, the OLT can receive signals of intense optical power and signals of weak optical power at the same time, so that the dynamic range of an optical signal receiving device can be widened. As a result, even when light intensities of received signals are different, a high-speed PON system can be realized.

Referring to FIG. 5, the following describes the structure of an ONU ID reverse-bias voltage correspondence table in the first embodiment of the present invention. FIG. 5 is a drawing showing an ONU ID reverse-bias voltage correspondence table stored in the random access memory 12 of the embodiment of the present invention. The ONU ID reverse-bias voltage correspondence table includes four items: ONU ID 501, ONU-OLT level difference 502, OLT input power 503, and reverse-bias voltage 504. Thereby, as shown in FIG. 5, when an optical signal having ONU ID of "1" is received, a reverse-bias voltage to be set is determined as "15V."

The following describes an example of calculating a reverse-bias voltage value and storing it in the memory. When transmission power of all ONUs is already known, "OLT input power" can be calculated with reference to "ONU-OLT level difference" and ONU transmission power. With reference to OLT input power, that is, the value of intensity of an optical signal received from each ONU, and the characteristic data of an APD device, an optimum multiplication factor of the APD is determined, and a reverse-bias voltage is calculated. Or, the intensity of an optical signal inputted to the OLT may be detected for storage in the memory 12.

Second Embodiment

Figure 6:
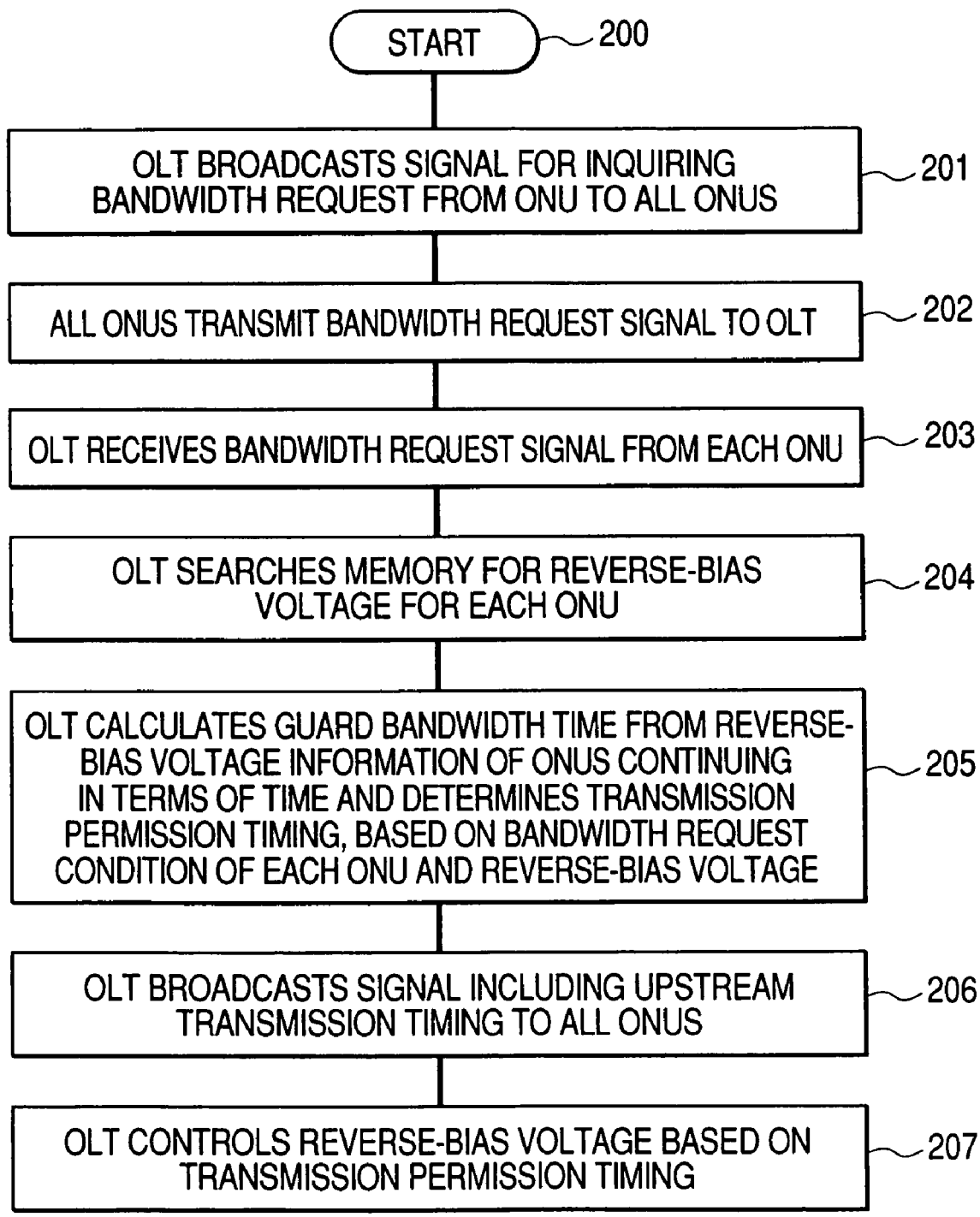
FIG. 6 is a flowchart for explaining the operation of a second embodiment of the present invention.

Referring to FIG. 6, the following describes an operation procedure of the entire PON system as a second embodiment. Moreover, a method for determining transmission timing and a method for controlling reverse-bias voltage are described. A basic construction of the PON system is the same as that of FIG. 1.

The OLT broadcasts a signal for inquiring a bandwidth request from the ONUs to all ONUs (Step 201). However, this step is not required when the ONUs automatically transmit a bandwidth request signal. After that, the ONUs transmit a bandwidth request signal called a REPORT frame to indicate the amount of data stored in buffers of the ONUs to the OLT (Step 202), and the OLT receives the bandwidth request signal (Step 203).

Next, the CPU 11 searches ONU-reverse-bias voltage correspondence information stored in the memory 12 (Step 204), determines the order of ONUs to transmit so that reverse-bias voltage difference is small as described in the first embodiment, based on bandwidth request conditions of each ONU and reverse-bias voltage information, calculates guard bandwidth time from reverse-bias voltage information of ONUs continuing in terms of time, and determines transmission permission timing (Step 205).

Thereby, since time required by the APD light receiving element to stabilize by adjusting reverse-bias voltage can be calculated from information of a reverse-bias voltage for ONU to transmit in preceding timing and a reverse-bias voltage for ONU to transmit in next timing, guard bandwidth time to be set can be determined. Here, it is assumed that stabilization time is derived in advance based on APD property data.

The DBA determines the respective transmission timings of the ONUs with reference to guard bandwidth time to be set. Therefore, the APD light receiving elements can be stabilized within guard bandwidth time.

Although the second embodiment assumes that the ONU-reverse-bias voltage correspondence information is stored in advance in the memory 12, the APD 15 may detect the intensity of optical signal, and derive a reverse-bias voltage for storage in the memory.

Finally, the OLT broadcasts a signal including upstream transmission timing to all ONUs (Step 206). The OLT controls reverse-bias voltage, based on transmission permission timing (Step 207). Thereby, since a dynamic range can be widened by changing reverse-bias voltage, and guard time can be shortened, a bandwidth can be effectively used.

Figure 7:
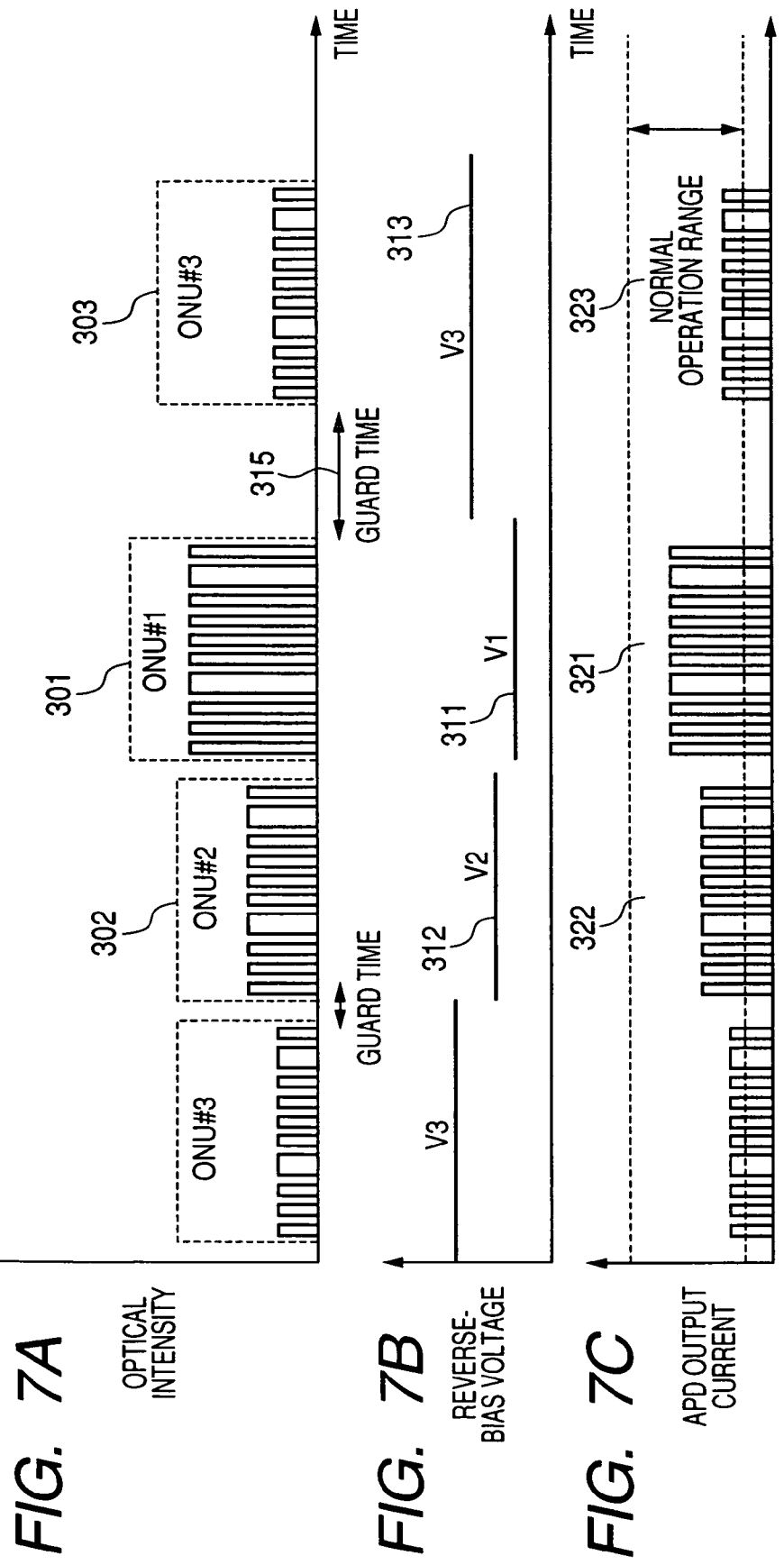
FIG. 7A, FIG. 7B, and FIG. 7C are drawings for explaining a method of allocating bandwidths and setting reverse-bias voltage of a second embodiment of the present invention.
Figure 8:
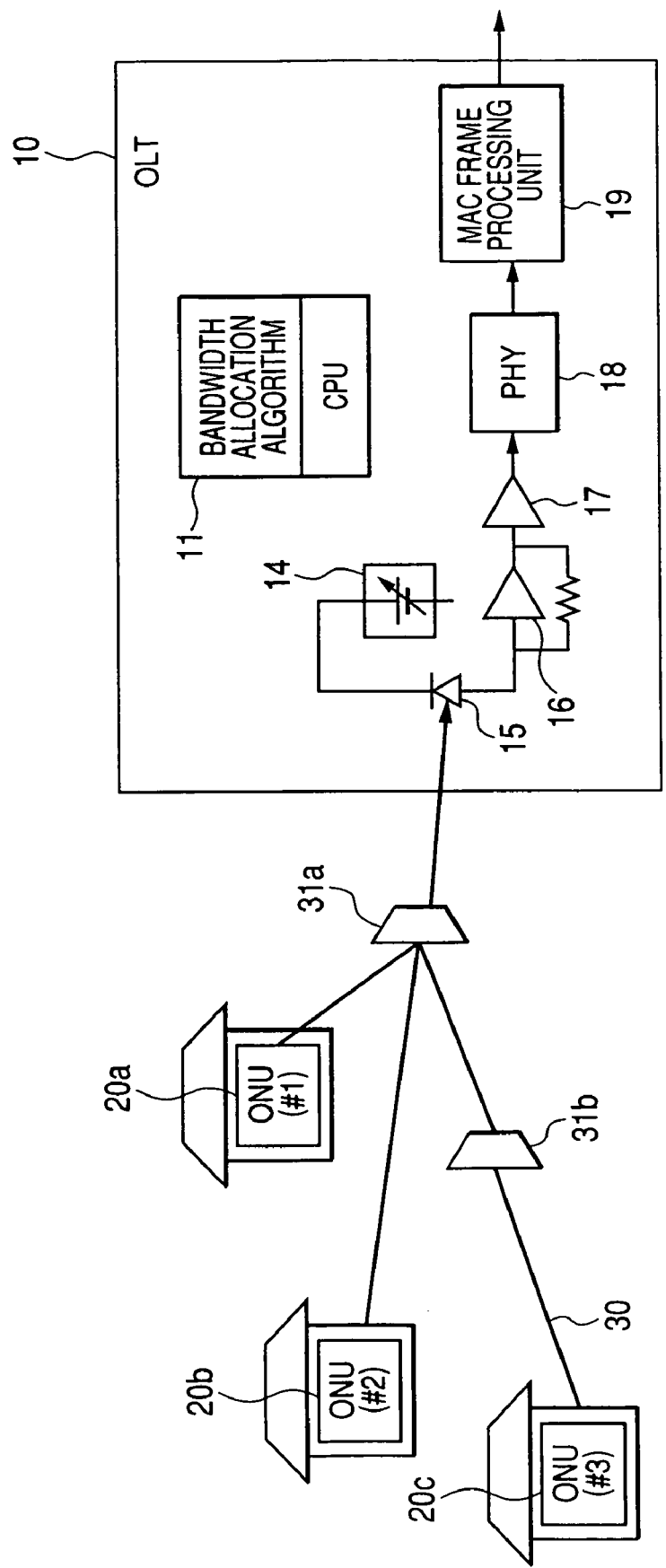
FIG. 8 is a block diagram of a conventional PON system.

Referring to FIG. 7, the following describes a method for setting bandwidth allocation and reverse-bias voltage, taking a difference of reverse-bias voltage in the second embodiment of the present invention into account.

FIG. 7A shows an example of optical power of optical signals received in the OLT, and takes optical power in a vertical axis and time in a horizontal axis. Optical signals 301, 302, and 303 indicate signals from ONU (#1) 20*a*, ONU (#2) 20*b*, and ONU (#3) 20*c*, respectively. The intensity of optical signals indicates reception intensity in the OLT. In short, the optical signal 301 indicates that it is more intense in optical power than the optical signal 303.

FIG. 7B shows an example of reverse-bias voltage of the APD, and takes reverse-bias voltage in a vertical axis, and time in a horizontal axis. Reverse-bias voltage V1 (311), V2 (312), and V3 (313) indicate the values of reverse-bias voltage when signals are received from the ONU (#1) 20*a*, ONU (#2) 20*b*, and ONU (#3) 20*c*, respectively. For optical signals of intense intensity, a reverse-bias voltage is set small, while for optical signals of weak intensity, a reverse-bias voltage is set large.

The DBA determines the respective transmission timings of ONUs so that a time difference between the timing of terminating transmission of an optical signal of a preceding ONU and the timing of starting transmission of an optical signal of a next ONU is equal to or greater than a specific threshold value, based on information of a reverse-bias voltage for ONU to transmit in preceding timing and a reverse-bias voltage for ONU to transmit in next timing.

For example, when a reverse-bias voltage changes from V3 to V1, since a change occurs from the optical signal 301 of intense optical power to the optical signal 303 of weak optical power, there is concern for the influence of interference and stabilization time within the APD element. Therefore, guard bandwidth time 315 greater than stabilization time of the APD element is set to determine ONU transmission timing by the DBA system.

FIG. 7C shows APD currents received in the OLT, and takes APD currents in a vertical axis and time in a horizontal axis. APD currents 321, 322, and 313 show the values of APD currents after optical signals from the ONU (#1) 20*a*, ONU (#2) 20*b*, and ONU (#3) 20*c*, respectively are subjected to photoelectric conversion. As a result of adjusting reverse-bias voltage, it is understood that the APD currents fit in a current range in which a transimpedance amplifier 16 and following circuits operate normally.

In such a state, a problem caused by receiving a signal of weak optical power immediately after a signal of intense optical power can be sufficiently reduced. Therefore, the OLT can receive a signal of intense optical power and a signal of weak optical power at the same time, so that the dynamic range of an optical signal receiving device can be widened. As a result, even when light intensities of received signals are different, a high-speed PON system can be realized.

Hereinbefore, the first and second embodiments of the present invention have been described in detail. The present invention is not limited to the embodiments, and those skilled in the art may make changes according to specific situations.

For example, although the first and second embodiments of the present invention have been described using EPON as an example, the present invention can apply to other passive optical networks (PON) such as a passive optical network based on ATM (APON) and a gigabit passive optical network (GPON).

As is apparent from the above description, according to the present invention, in a very-fast PON system, bandwidths are dynamically allocated according to reverse-bias voltage information, and the dynamic range of the photoreceiver sensitivity of OLT can be widened by controlling transmission timing and reverse-bias voltage of APD.

What is claimed is:

1. A passive optical network (PON) system, comprising:
an optical line terminal (OLT) and a plurality of optical network units (ONU) connected via an optical fiber, OLT including an optoelectronic transducer that changes in current multiplication factor according to applied reverse-bias voltage, the OLT determining, when allocating transmission bandwidths of upstream signals to the plurality of ONUs, an allocation order of the transmission bandwidths in such a way that, for each ONU of the plurality of ONUs to which a subsequent transmission bandwidth is allocated immediately after a previous transmission bandwidth was allocated to another ONU of the plurality of ONUs, a voltage difference between a reverse-bias voltage necessary to receive an upstream signal from the ONU to which the subsequent transmission bandwidth is allocated and a reverse-bias voltage necessary to receive an upstream signal from the ONU to which the previous transmission bandwidth was allocated is satisfactorily small.

2. The PON system according to claim 1, wherein the OLT holds information of the respective necessary reverse-bias voltages of the plurality of ONUs, and references the information to determine the allocation order of the transmission bandwidths.

3. The PON system according to claim 1, wherein the OLT determines, when determining a respective transmission timing of an upstream signal to be transmitted by each ONU of the plurality of ONUs for which the respective transmission timing immediately follows a preceding respective transmission timing determined for an upstream signal to be transmitted by another ONU of the plurality of ONUs, the respective transmission timing that immediately follows the preceding transmission timing based on a voltage difference between the reverse-bias voltage corresponding to the ONU for which the preceding respective timing is determined and a reverse-bias voltage corresponding to the ONU for which the respective transmission timing that immediately follows the preceding transmission timing is being determined.

4. The PON system according to claim 1, wherein the OLT controls the reverse-bias voltages according to the determined allocation order of the transmission bandwidths.

5. The PON system according to claim 1, wherein the OLT, based on bandwidth request conditions of each ONU and reverse-bias voltage information of the ONUs, determines transmission permission timing by calculating a guard bandwidth time from the reverse-bias voltage information of the ONUs continuing in terms of time.

6. A method of receiving an optical signal in a passive optical network (PON) system in which an optical line terminal (OLT) and a plurality of optical network units (ONU) are connected via an optical fiber, and in which the OLT includes an optoelectronic transducer that changes in current multiplication factor according to applied reverse-bias voltage, the method comprising:

determining, by the OLT when allocating transmission bandwidths of upstream signals to the plurality of ONUs, an allocation order of the transmission bandwidths in such a way that, for each ONU of the plurality of ONUs to which a subsequent transmission bandwidth is allocated immediately after a previous transmission bandwidth was allocated to another ONU of the plurality of ONUs, a voltage difference between a respective reverse-bias voltage necessary to receive an upstream signal from the ONU to which the subsequent transmission bandwidth is allocated and a respective reverse-bias voltage necessary to receive an upstream signal from the ONU to which the previous transmission bandwidth was allocated is satisfactorily small.

7. The method of receiving an optical signal according to claim 6, wherein the OLT holds information of the respective necessary reverse-bias voltages of the plurality of ONUs, and references the information to determine the allocation order of the transmission bandwidths.

8. The method of receiving an optical signal according to claim 6, wherein the OLT determines, when determining a respective transmission timing of an upstream signal to be transmitted by each ONU of the plurality of ONUs for which the respective transmission timing immediately follows a preceding respective transmission timing determined for an upstream signal to be transmitted by another ONU of the plurality of ONUs, the respective transmission timing that immediately follows the preceding transmission timing based on a voltage difference between the reverse-bias voltage corresponding to the ONU for which the preceding respective timing is determined and a reverse-bias voltage corresponding to the ONU for which the respective transmission timing that immediately follows the preceding transmission timing is being determined.

9. The method of receiving an optical signal according to claim 6, wherein the OLT controls the reverse-bias voltages according to the determined allocation order of the transmission bandwidths.

10. The PON system according to claim 6, wherein the OLT, based on bandwidth request conditions of each ONU and reverse-bias voltage information of the ONUs, determines transmission permission timing by calculating a guard bandwidth time from the reverse-bias voltage information of the ONUs continuing in terms of time.

11. The PON system according to claim 6, wherein the OLT, based on bandwidth request conditions of each ONU and reverse-bias voltage information of the ONUs, determines transmission permission timing by calculating a guard bandwidth time from the reverse-bias voltage information of the ONUs continuing in terms of time.

12. An optical line terminal (OLT) connected to a plurality of optical network units (ONU) via an optical fiber, the OLT comprising:

an optoelectronic transducer that changes in current multiplication factor according to applied reverse-bias voltage, and wherein the OLT determines, when allocating transmission bandwidths of upstream signals to the plurality of ONUs, an allocation order of the transmission bandwidths in such a way that, for each ONU of the plurality of ONUs to which a subsequent transmission bandwidth is allocated immediately after a previous transmission bandwidth was allocated to another ONU of the plurality of ONUs, a voltage difference between a reverse-bias voltage necessary to receive an upstream signal from the ONU to which the subsequent transmission bandwidth is allocated and a reverse-bias voltage necessary to receive an upstream signal from the ONU to which the previous transmission bandwidth was allocated is satisfactorily small.

13. The OLT according to claim 12, wherein the OLT holds information of the respective necessary reverse-bias voltages of the plurality of ONUs, and references the information to determine the allocation order of the transmission bandwidths.

14. The OLT according to claim 12, wherein the OLT determines, when determining a respective transmission timing of an upstream signal to be transmitted by each ONU of the plurality of ONUs for which the respective transmission timing immediately follows a preceding respective transmission timing determined for an upstream signal to be transmitted by another ONU of the plurality of ONUs, the respective transmission timing that immediately follows the preceding transmission timing based on a voltage difference between the reverse-bias voltage corresponding to the ONU for which the preceding respective timing is determined and a reverse-bias voltage corresponding to the ONU for which the respective transmission timing that immediately follows the preceding transmission timing is being determined.

15. The OLT according to claim 12, wherein the OLT controls the reverse-bias voltages according to the determined allocation order of the transmission bandwidths.

* * * * *